US009378621B2

(12) United States Patent
Conway et al.

(10) Patent No.: US 9,378,621 B2
(45) Date of Patent: Jun. 28, 2016

(54) WAGERING GAME, GAMING MACHINE, GAMING SYSTEM AND METHOD WITH A TOUCH-ACTIVATED RESIDUAL GRAPHIC EFFECT FEATURE

(75) Inventors: Michael D Conway, Austin, TX (US); Matthew A. Kyle, Austin, TX (US); J P Cody, Austin, TX (US)

(73) Assignee: EVERI GAMES, INC., Austin, TX (US)

( * ) Notice: Subject to any disclaimer, the term of this patent is extended or adjusted under 35 U.S.C. 154(b) by 924 days.

(21) Appl. No.: 13/205,519

(22) Filed: Aug. 8, 2011

(65) Prior Publication Data

US 2012/0115599 A1 May 10, 2012

Related U.S. Application Data

(60) Provisional application No. 61/410,819, filed on Nov. 5, 2010.

(51) Int. Cl.
*G07F 17/34* (2006.01)
*A63F 13/10* (2006.01)
*G07F 17/32* (2006.01)

(52) U.S. Cl.
CPC .................................... *G07F 17/326* (2013.01)

(58) Field of Classification Search
USPC .......................................... 463/20, 21, 31, 37
See application file for complete search history.

(56) References Cited

U.S. PATENT DOCUMENTS

| | | | | |
|---|---|---|---|---|
| 7,656,393 | B2 * | 2/2010 | King et al. | 345/173 |
| 8,157,638 | B2 * | 4/2012 | Young | 463/19 |
| 2004/0229693 | A1 * | 11/2004 | Lind et al. | 463/37 |
| 2005/0030295 | A1 * | 2/2005 | Muir | 345/173 |
| 2006/0026521 | A1 * | 2/2006 | Hotelling | G06F 3/0418 715/702 |
| 2008/0303837 | A1 * | 12/2008 | Swift et al. | 345/541 |
| 2009/0124345 | A1 * | 5/2009 | Gilmore et al. | 463/20 |
| 2009/0191946 | A1 * | 7/2009 | Thomas | G07F 17/3209 463/20 |
| 2009/0284532 | A1 | 11/2009 | Kerr et al. | |

OTHER PUBLICATIONS http://startrail.mac.findmysoft.com, Startrail 2.1, date retrieved May 13, 2010 (2 pages).

* cited by examiner

*Primary Examiner* — Pierre E Elisca

(74) *Attorney, Agent, or Firm* — Russell D. Culbertson, Esq.; Nathan Calvert, Esq.; J P Cody, Esq.

(57) ABSTRACT

A wagering game includes a display assembly having a touch-sensitive display adjacent to or overlaying a display area operable to present a wagering game presentation. The touch-sensitive display is operable to display a residual graphic effect such as a trailing particle effect following the path of a player's finger or other contactor in contact with the touch-sensitive display. The residual graphic effect may include repeated discrete graphic elements such as a star or sparkle, or a game theme-associated element such as a butterfly or butterflies corresponding to a butterfly themed game. The residual graphic effect may also or alternatively include an effect such as a wave or ripple visual effect or a shockwave visual effect which does not necessarily include any discrete graphic element.

19 Claims, 7 Drawing Sheets

WAGERING GAME, GAMING MACHINE, GAMING SYSTEM AND METHOD WITH A TOUCH-ACTIVATED RESIDUAL GRAPHIC EFFECT FEATURE

CROSS-REFERENCE TO RELATED APPLICATION

The Applicants claim the benefit, under 35 U.S.C. §119(e), of U.S. Provisional Patent Application No. 61/410,819 filed Nov. 5, 2010, and entitled "Wagering Game, Gaming Machine, Gaming System And Method With A Touch-Activated Residual Graphic Effect Feature." The entire content of this provisional application is incorporated herein by this reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent files or records, but otherwise reserves all rights of copyright whatsoever.

BACKGROUND OF THE INVENTION

1. Field of the Invention

This invention relates to wagering games, gaming machines, gaming systems, and associated methods. More particularly, the invention relates to wagering games, gaming machines, gaming systems and related methods including a touch-sensitive display operable to display a residual graphic effect which may, for example, follow the path of a player's finger across the display.

2. Description of the Related Art

Various gaming machines have been developed to provide wagering games and present game results. Also, designers have included lights, sounds, and video to generate player interest and excitement. There continues to be a need for innovative methods and gaming machines presenting wagering games in different ways to generate player interest and excitement.

SUMMARY OF THE INVENTION

An embodiment of the present invention includes a wagering game operable on a gaming apparatus including a display assembly with a touch-sensitive display area adjacent to, overlaying, or corresponding to a display area operable to present a wagering game presentation. The touch-sensitive display area is operable upon initiation by a suitable player touch to display a residual graphic effect on the touch-sensitive display, either before, during, or after a game play sequence (a game play sequence including the placement of a wager and then the operation of the gaming apparatus to display a result for the wager). For example, a player may drag a finger along the touch-sensitive display and view a residual graphic effect that follows the path of the player's finger. The graphic effect may comprise a repeated discrete graphic element, such as a star or sparkle (which may be thought of as a "particle"), or may comprise an effect involving a non-discrete graphic effect such as a wave effect which expands across the display from the point of the player touch. Particularly where the graphic effect includes discrete graphic elements, the graphic elements may be associated with a game theme, or may comprise a theme-associated pattern (e.g. a butterfly or butterflies corresponding to a butterfly themed game). The graphical residual effect may be visible for a period of time following the player's activation of the effect by touching the display, and then may fade or otherwise disappear from the touch-sensitive display.

A player touch of a touch-sensitive display device may be by an extremity of the player, such as the player's finger, or through an intermediate device such as a stylus. As used in this disclosure and the accompanying claims, a player "touch" encompasses any type of touch of the touch-sensitive display area, either direct, or through an intermediate device. Also, the term "contactor" will be used in this disclosure and the accompanying claims to refer to anything that may be used to make a player touch, whether a player's finger or other extremity, or an intermediate device such as a stylus.

As will be discussed in detail below, the designation "residual graphic effect" as used herein and the attached claims refers to a graphic effect which includes (i) repeated discrete graphic elements or icons such as stars, sparkles, butterflies, and other graphic devices, and/or (ii) effects which do not rely on discrete graphic elements such as ripple or wave graphic effects. The designation "residual graphic effect" does not include informative textual or icon displays such as pop-up menus which may be generated on a touch-sensitive display device responsive to a touch of the device.

These and other embodiments, advantages and features of the invention will be apparent from the following description of embodiments, considered along with the accompanying drawings.

DESCRIPTION OF ILLUSTRATIVE EMBODIMENTS

Figure 1:
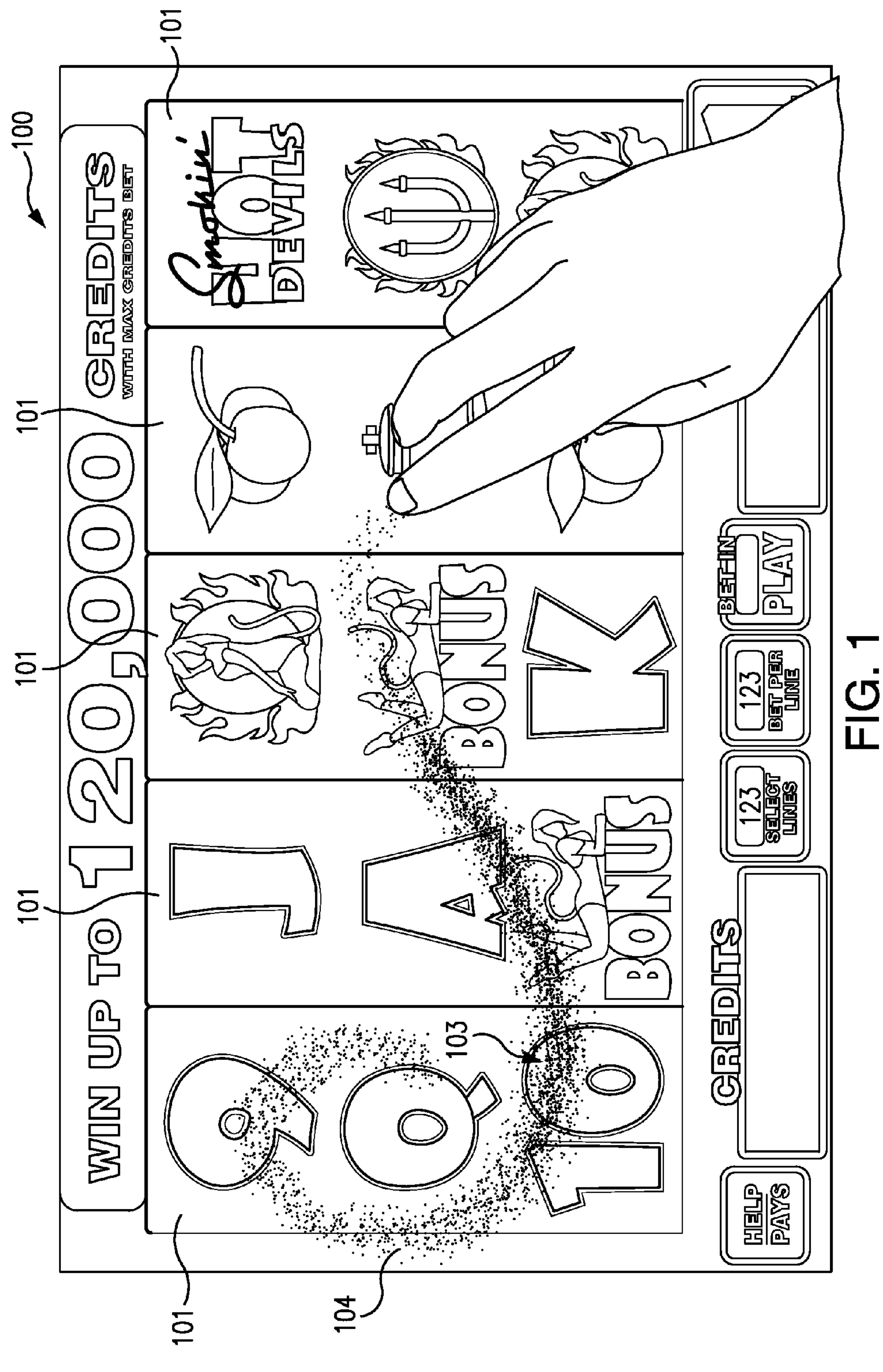
FIG. 1 is a representation of a screenshot of a primary display on the front of a gaming machine wherein a residual graphic effect (in this case a residual trailing particle effect) is shown in accordance with one or more embodiments.

Referring to FIG. 1, an example screenshot of primary display 100 of a gaming apparatus is shown in accordance with one or more embodiments. This example screenshot displays a wagering game with five reels 101 together with residual graphic effect 103 which visually captures or indicates player interaction with primary display 100 before, during, and after play of the game. In the example, residual graphic effect 103 comprises a residual trailing particle effect which is displayed following the path traversed by a player's finger while the finger is in contact with a touch-sensitive display panel comprising primary display 100. While residual graphic effect 103 may be independent of the game function in terms of identifying game results, a player may choose to engage in a series of actions, such as gliding a finger (knuckle, palm, or stylus) along the touch-sensitive display device in various patterns, to create an effect that may be visually pleasing to the player, or which the player may consider lucky, or which may cooperate in showing game results or aspects of the game presented on the display device. Essentially, residual graphic effect 103 graphically illustrates a player's interaction with display 100 in association with the wagering game, the interaction being captured through signals from the touch-sensitive display and communicated to a processor which is programmed to respond by transmitting corresponding display instructions to the display.

The images of the reels or features of the displayed game and the displayed residual graphic effect may be characterized three dimensionally (e.g. the game display in a background plane or spatial volume and the residual graphic effect in a foreground plane or spatial volume). To generate this visual effect, the display of the respective images may be configured on a two-dimensional display, two or more overlaying displays, or a light-transmissive video display overlaying a display window overlaying mechanical features (e.g. a set of mechanical reels, dice, a wheel, etc.).

Residual graphic effect 103 may be initiated by the player before, during, or after play of the wagering game, and may persist for a pre-determined period of time, such as a three second period, in accordance with a residual graphic effect sub-routine or program module executed by one or more processing devices included in the gaming machine including display 100. Particles such as the individual sparkles or stars 104 included in residual graphic effect 103 may be programmed to fade out or to immediately vanish following the pre-determined time period. The pre-determined time period may commence after the player removes the finger or other contactor from the display and thus may be associated with the entire trailing effect pattern. Alternatively, the pre-determined time period may commence after the activation/display of each associated particle so that the earliest activated/displayed particle vanishes or fades, followed by the next earliest activated/displayed particle, and so forth. The residual graphic effect code may be a sub-routine of a primary game program executable on a gaming processor, or may be an independent program executable by the primary game processor or a display controller operable to drive content onto the touch-sensitive display (or alternatively, onto the primary display overlaid by the touch-sensitive display).

The residual graphic effect code may be implemented on any gaming apparatus including a touch-sensitive display. The touch-sensitive display may be incorporated with a primary and/or feature game display (or display area) where the primary game presentation may include a video and/or mechanical reel, a video playing card, and/or video or mechanical wheel or dice game presentation. In various examples, a primary and/or feature game may include a game presentation on a display with a video simulation of spinning reels, dealt playing cards, or a spinning wheel; one or more displays may include a touch-sensitive area or display on which the player may slide a finger or other contactor to initiate the residual graphic effect. In other examples, the primary and/or feature game may include a game presentation using mechanical or non-video elements (such as a set of mechanical reels, a mechanical wheel, playing cards, and/or dice) and a window overlaying the mechanical or non-video elements may include a touch-sensitive display panel on which the player may slide a finger or other contactor to initiate the residual effect.

The residual graphic effect may comprise one or more repeated discrete graphic elements or particles, such as a star or sparkle as shown at reference numeral 104 in the example effect 103 in FIG. 1, and be characterized by an emission point or emission area, physics properties (e.g. mass, gravity, velocity, direction, resistance, time), and physics algorithms such as to govern particle trajectories and motion. The particle graphic effect may be initiated, such as by the execution of the residual graphic effect code by a processor after receiving transmission of a touch-panel signal from the touch-sensitive panel in response to the contact of a finger or other contactor with the touch-sensitive panel. The touch-panel signal may carry at least one coordinate associated with the touch-sensitive panel and the player's touch (such as the coordinate associated with substantially the center of the contactor with the touch-sensitive panel); and, the touch-sensitive panel may transmit a plurality of touch-panel signals (such as on a periodic basis corresponding to a clock cycle of a clock associated with the touch-sensitive panel) with associated coordinates to the processor at least for so long as the player touches the touch-sensitive panel. Corresponding to each of the touch-panel signals, the processor may execute the residual graphic effect code to generate particle display information and transmit a particle display signal containing the particle display information to a display controller configured (as with coding, such as display driver software) to generate, responsive to the particle display signal, a particle image display at or about the indicated coordinate of the display.

The particle display information may include a velocity parameter, a directional parameter, a gravity parameter, a mass parameter, a particle quantity (or volume) parameter, a particle emitter width parameter, a color parameter, a time of life parameter, etc. These parameters may be modified based on the velocity and direction of motion of the player's finger or other contactor through physics algorithm coding included in the residual graphic effect code executed by the processor. For example, in the event that the player's finger or other contactor is stationary and touching the touch-sensitive screen, the velocity parameter may have an unadjusted value in accordance with a value programmed into the particle display coding, such as 0.1 ft/sec, and the directional parameter may have an unadjusted value, such as 90 degrees on a rectangular coordinate system, so that an emitted particle display shows a programmed number of particles emit at a velocity of 0.1 ft/sec in the upward (90 degree) direction during each cycle from the stationary coordinate. On the other hand, if the player's finger is moving, the player's finger velocity with respect to the touch-sensitive screen may be determined by the processor by determining the distance between the coordinates supplied by the touch-sensitive screen in successive timing cycles and dividing by the time differential; similarly, the player's finger direction may be determined. Both the player's finger velocity and direction may be utilized by the processor to adjust the programmed particle velocity and direction parameters so that the particle display shows the programmed number of particles emitted at the adjusted velocities and directions. In the event that multiple particles are programmed to emit substantially simultaneously, a beam (or pattern) parameter may be supplied, such as to provide a distribution angle of ten degrees over which the individual emitted particles may vary from the direction parameter; for example, if the direction parameter is ninety degrees, the simultaneously emitted particles (or particles emitted over a single cycle from a given location) may be programmed to vary in direction between eighty-five to ninety-five degrees. Depending upon the gravity parameter and a time of life parameter, each displayed particle may be controlled through the executed graphic effect program code based on its velocity and direction to follow a path on the display and to either fade or vanish from the display after the end of life time period has passed. Additionally, a color parameter or set of parameters may be programmed into the particle display coding, such that each particle may be displayed as the same or a different color depending upon the color parameter/s provided by the processor. The gravity parameter may be a value (positive, zero, or negative) programmed into the particle display coding which may be fixed or varied with respect to each particle. For example, a first particle may be programmed to follow a path p1 determined with the physics algorithm wherein the first particle has a mass m1, a velocity v1, a direction d1, a gravity field g1, a time of life t1; whereas a second particle may be programmed to follow a path p2 wherein the second particle has a mass m2, velocity v2, direction d2, gravity field g2, and time of life t2, one or all of which may be the same or vary from the first particle. For instance, the first and second particles may be emitted from the same or different coordinates and during the same or different cycles, v1 and v2 may be the same or different, d1 and d2 may be the same or different from a directional parameter by a designated number of degrees, and, g1 and g2 may be the same or have different values (e.g. g1 may be one gravity (32.2 ft/sec2) while g2 may be a negative one gravity (−32.2 ft/sec2)).

The discrete graphic elements or particles included in a residual graphic effect may comprise one or more discrete theme-associated graphic elements. For example, a theme-associated graphic element may be one or more flying butterflies, such as in the case of a primary game theme comprising a butterfly theme. As additional examples, a theme-associated graphic element may be one or more flowers or bouquets of flowers, such as in the case of a primary game theme comprising flowers, or, the theme-associated graphic element may be pitchforks, thematic devils, or fire balls, such as in the case of the Smokin' Hot Devils™ wagering game of Multimedia Games as shown in FIG. 1, or the theme-associated graphic element may be one or more bubbles or balloons, such as in the case of a primary game theme comprising a party or playground. In one or more alternatives, the theme-associated discrete graphic elements may comprise one or more graphic elements associated with a primary game and one or more different graphic elements associated with a feature (or bonus) game triggered from the primary game. For example, the theme-associated graphic element of the residual graphic effect corresponding to the primary game may comprise bubbles; however, when the feature game is active, the theme-associated graphic element of the residual graphic effect may comprise gold coins. The processing device executing the residual graphic effect program code would detect the change between a primary game and a feature game and change the graphic element for the residual graphic effect accordingly. Each graphic element (e.g. a bubble, coin, butterfly) of the theme-associated graphic elements may be characterized by parameters in the same manner as each of the non-theme graphic elements described above (using stars or sparkles as examples). Some discrete graphic elements may be characterized by different parameters than those described above. For example, butterflies may be characterized by the various parameters described above and also include a random flight parameter. Bubbles or balloons may, in addition to the movement control parameters described above, may have an elastic collision parameter to characterize collisions between bubbles or balloons, or a dimensional parameter to characterize movement in one plane versus movement in another plane. The movement of coins included in a residual graphic effect may include a rotating or spinning parameter to characterize a flipping or spinning coin.

As described herein the discrete graphic elements associated with the residual graphic effect may generally be displayed overlaying the reels or features of the displayed game. For example, the display parameters may provide for the reels or features of the displayed game to be characterized in one or more planes while the residual graphic effect may be characterized in one or more overlaying planes.

In a further alternative, a player may override a default graphic element for use in the residual graphic effect by selecting a personalized graphic element from a menu of available graphic elements which may be used in the residual graphic effect, such as a shamrock, horseshoe, gold coin, rabbit's foot, rainbow, or other traditional or non-traditional items associated with luck. For example, an area overlaying or corresponding to the display area of the primary and/or feature game presentation (e.g. video or mechanical reels, cards, roulette wheel, bingo card, etc.) may be operated under the control of program code to display a residual graphic effect menu (which may also be referred to as a "lucky icon menu" or a "residual graphic effect personalization menu") upon one or more taps on the touch-sensitive display. Alternatively, the lucky icon menu may be a player-selectable option available on one of several displays associated with a gaming apparatus, such as a player display connectable with or through a gaming network and/or player tracking server (e.g. Bally iView or DM iView apparatus, or, IGT Player Tracking or NexGen Player Tracking Assembly). Once opened, the lucky icon menu may provide, for example, a selection of a shamrock, horseshoe, gold coin, rainbow, rabbit's foot, or default icon available for use as a discrete graphic element to be used in the residual graphic effect. A player may select any of these lucky icons for use as the discrete graphic element in the present residual graphic effect by pressing on the area associated with the respective lucky icon. Once the selection is made, the program code associated with the menu may be executed to cause the lucky icon menu to vanish, and the player may slide a finger or other contactor across the screen to initiate the residual graphic effect employing the player's selected (that is, personalized) graphic element. When the player cashes out, removes a player card, or ceases play for a pre-determined period of time, the selected graphic element for use in the residual graphic effect may revert to the pre-programmed default graphic element (icon).

In systems where the player may insert a player card into a card reader associated with a gaming apparatus, the player's selected, personalized lucky icon for use in a residual graphic effect may be stored and associated with the player's card such that when the player initiates subsequent gaming sessions, the player's previously selected personalized lucky icon may then be used in the residual graphic effect for that respective gaming session in the event that the gaming machine selected for the gaming session supports the residual graphic effect. The player may de-select the personalized lucky icon by opening the lucky icon menu again and selecting the default icon or selecting a different icon or residual graphic effect. Of course, in gaming systems which support player tracking with some sort of player identification other than a player card, the player's personalized lucky icon for use as the graphic element in a residual graphic effect may be associated with the player via the particular player identification process employed by the given system.

In some embodiments, a residual graphic effect may be implemented without employing any discrete graphic element which is generated at different points on the gaming machine touch-sensitive display. For example, a residual graphic effect according to one or more embodiments may use a localized distortion of the display image or other graphic effect. Such a localized distortion or other graphic effect may be static (that is, may not move across the touch-sensitive display) or may be dynamic so as to move across the display. An example of a dynamic residual graphic effect which does not necessarily employ a discrete graphic element or icon is a wave or ripple effect generated on the touch-sensitive display in response to the player touch. A player may touch the touch-sensitive display at a single location to cause a wave or ripple (similar to a ripple on the still surface of a liquid) to radiate out from the touch location. Where the player drags their finger or other contactor across the touch-sensitive display, the wave or ripple generated on the display may radiate out from the touch line similar to the wake of a boat travelling through a body of water. An example of a static residual graphic effect which does not employ a discrete graphic element or icon is an effect which produces a background color change around a touch point on the touch-sensitive display. Although the color change comprising the residual graphic effect may eventually fade away to the original color, the graphic effect may be static in the sense that it does not expand or move across the display. Of course, other implementations may include color changes or other graphic effects that do not include discrete graphic elements or icons but which do move across the display and are thus dynamic.

The lucky icon menu arrangement described above with respect to discrete graphic elements which may be used in a residual graphic effect, may be expanded to include options for the player to select residual graphic effects which do not necessarily employ discrete graphic elements such as lucky icons or other discrete graphic elements. In one or more embodiments, the menu items displayed on the player personalization menu (lucky icon menu), may include names or descriptive titles and/or associated graphic indicators (icons) for one or more residual graphic effects which do not rely on discrete graphic elements. For example, the personalization menu may include a wave/ripple option, a shock-wave option, a smoke/fog option, and an X-ray option. The wave/ripple option, when selected from the menu and later initiated by a player touch of the touch-sensitive display, would produce a residual graphic effect comprising a wave graphic. When the shock-wave option is selected and initiated, the display would show a shock wave expanding from the contact point and interacting with other graphic features shown on the display. The smoke/fog option might be implemented to produce a trail of smoke as a player drags their finger across the touch-sensitive display, similar to smoke released from a plane in an air show. The X-ray option might be implemented to convert a portion of the graphic elements around the player touch location on the touch-sensitive display to an X-ray type image which may disclose graphic features not present in the graphic displayed immediately before the player touch. Regardless of how these various non-discrete graphic element residual graphic effects are implemented, they may be implemented ultimately through program code executed by various processing devices which control the presentation produced on the touch-sensitive display. This program code may include, and operate on, various parameters which dictate aspects of the residual graphic element, such as, for example, how quickly the wave/ripple expands across the display, or how the smoke/fog trail behaves over the course of time.

Figure 2:
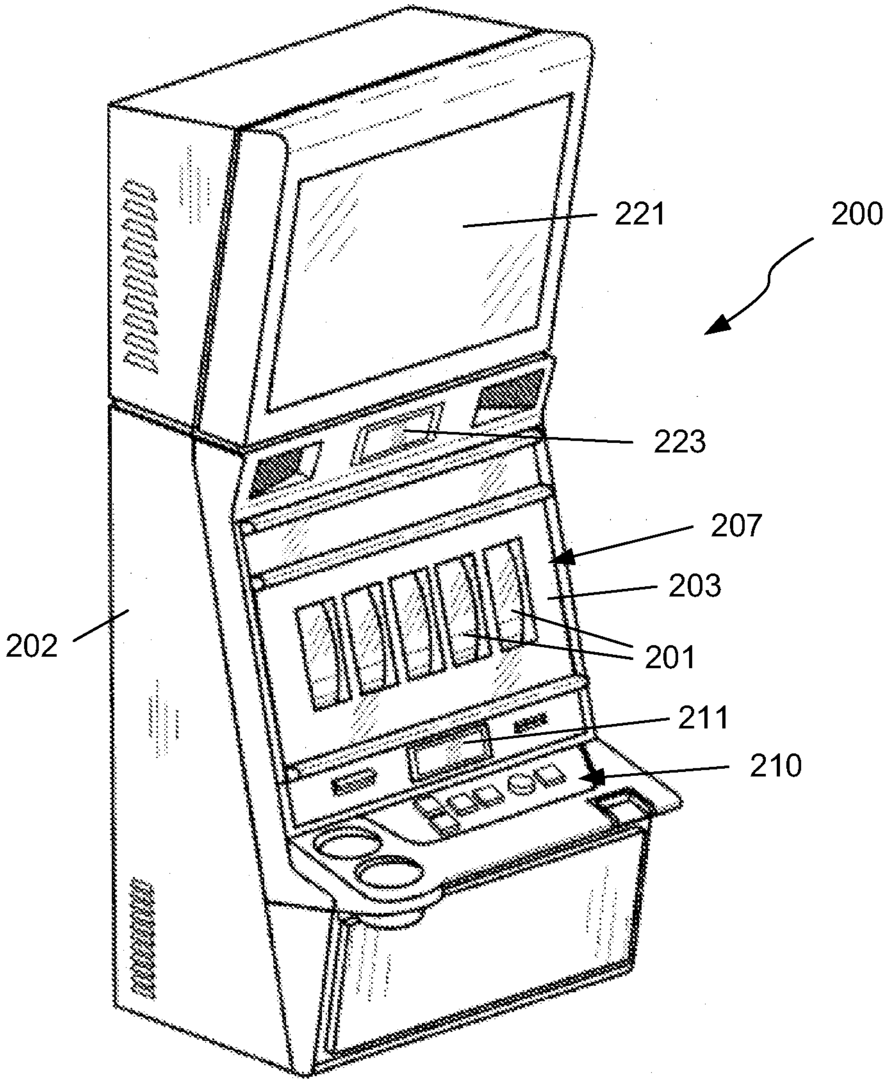
FIG. 2 is a front perspective view of an example gaming machine according to one or more embodiments.

Referring to FIG. 2, gaming machine 200, such as a Multimedia Games Smokin' Hot Devils™ gaming machine, is shown including primary display 207 with which a residual graphic effect may be displayed in accordance with one or more embodiments. Primary display 207 encompasses a game display area 203 which includes a set of reels 201. The illustrated gaming machine 200 also includes a top box display 221 which may display a paytable with various winning outcomes associated with various awards, and a middle display 223 which may display a server-based game (such as bingo, in the case of a Class II gaming machine), advertising, or other content as may be provided over a network. Gaming machine 200 also includes a player interface 210 including preferably several different buttons or input devices with which a patron may place wagers and initiate play of one or more games at gaming machine 200. All of the displays and other elements of gaming machine 200 are housed in or about gaming machine cabinet 202. While gaming machine 200 is shown as an upright gaming machine cabinet style, various cabinet styles may be utilized including a slant top cabinet style and a bar top cabinet style (where the cabinet may be part of a bar/table top and/or housed therein).

Each reel 201 includes a series of symbols (for example, as shown on reels 101 in FIG. 1) viewable in display area 203 (or through a glass window or transparent display, in the case of mechanical reels, wheel, dice, etc.). With the reels 201 in a stationary position, the symbols visible in display area 203 may be viewed as an array of symbols. During a wagering game (as may be initiated by a player by placing a wager and pressing a 'PLAY' button included in player interface 210), the reels may be simulated to spin (or electro-mechanically spun in the case of mechanical reels) about an axle under the control of a game processor which randomly or pseudo-randomly determines the game outcome and causes the reels to stop in accordance with the determined game outcome. Alternatively, the stop position of each reel 201 (virtual position in the case of video reels and actual mechanical stop position in the case of mechanical reels) may be randomly or pseudo-randomly determined to determine the symbols included in the displayed array and therefore the result of the play.

One or more paylines, combinations, or patterns of the symbols including those visible in display area 203 may be correlated to a game result payable in accordance with a paytable such as may be displayed on display 221. For example, a game with five reels and displaying four symbol locations per reel may have four paylines which extend horizontally across each reel, and many other paylines which may zig and zag across the various reel symbol locations both on and off the viewable display area. A patron may wager on one or more of the paylines during each game play. Display area 203 may thereby be used to display game results to one or more patrons who may view gaming machine 200 and the game processor may make payment to the patron by incrementing a credit meter for winning outcomes of paylines in accordance with the paytable and upon which the patron has wagered.

While example gaming machine 200 includes a set of five reels 201, various numbers of reels may be selected or utilized in an implementation of one or more embodiments, such as one, two, three, four, five, six, seven reels, and so forth.

Display area 203 may comprise an area of primary display 207 or may comprise a separate display in over- or underlaying relation. For example, primary display 207 may comprise a touch-sensitive display panel, such as a flat panel LCD or LED display, which may be programmed to display an opaque or thematic frame image (which may include video and/or still images) except over display area 203. Primary display 207 may be programmed to be transparent or translucent during game play of the primary wagering game, so that the patron may view the game presentation in display area 203. In addition, the entire display surface of primary display 207 (or a portion thereof) may be configured to respond to the patron's touch as described above to display a residual graphic effect before, during, and after game play.

In one or more alternative embodiments, primary display 207 may be controlled through program code executed by one or more processing devices associated with gaming machine 200 to display a bonus or feature game that may be triggered by the appearance of one or more special symbols in an instance of a primary game or by the occurrence of some other random event. For example, when a bonus or feature game is triggered, the entire primary display 207 (or a portion thereof) may be transformed to display the bonus or feature game on or about display area 203, and once the bonus or feature game is complete, primary display 207 may revert to the primary game display state.

In one or more alternative embodiments, a touch-sensitive portion of display 207 (such as a portion overlaying display area 203) may be programmed to display a player interactive element such as, for example, by displaying a selection of buttons and displaying a message to the player, 'choose a button,' implemented to enable player interactivity with the game, such as to select a displayed button or item, in order to cause the game to perform additional steps and/or provide one or more bonus or feature game outcomes and awards to the player. During a period when a player may be requested to interact with the game through the touch-sensitive display, the residual graphic effect may be temporarily disabled and then re-enabled once the player-to-game interaction has been completed. This temporary disablement and then enablement may be accomplished by program code executable by one or more processing devices included in gaming machine 200.

In one or more alternative embodiments, gaming machine 200 may include mechanical reels with fixed or dynamic symbols. Conventionally, reels 201 include reel strips with fixed symbols; however, reel strips may be, for example, implemented using FOLED (flexible organic LED) or comparable reel strips wherein one or more symbols may be programmed dynamically to vary the symbol and/or its appearance, either from one fixed image to another (such as changing a symbol to a wild symbol or changing a series of symbols to wild symbols), or, from a fixed image to a dynamic (e.g. animated or video) image or a set of miniature video reels. In various instances when a symbol changes to another symbol, a bonus or enhanced award may be paid in accordance with the paytable or a multiple thereof, or may be a bonus (a fixed or progressive amount) paid separate from the paytable. In the event that the payment is a progressive award, a progressive pool may be generated from an operator's marketing dollars or from play at one or more gaming machines which may be eligible for the progressive award.

Another approach to implementing a game employing a residual graphic effect as disclosed herein is to implement reels 201 virtually (video reels) on a display, such as primary display 207. In the case of virtual displays of the reels, the symbols may be fixed or animated on each of reels 201. In one or more alternative embodiments, overlapping display panels may be implemented to generate video or display effects over reels 201; for example, display area 203 may be implemented as a transmissive (e.g. Aruze or WMS transmissive display panels) display or a transparent (e.g. Bally's transparent display panels) display configured to display visual effects together with reels 201 under the control of the game processor during the operation of a wagering game. In the case of virtual reels, the virtual reels may be recessed a distance from display area 203 and segregated by dividers similar to dividers separating mechanical reels, which may provide a spatial characteristic (e.g. IGT's PureDepth display panels). In either case, the overlapping display may be touch-sensitive and configured to interact with the player by transmitting and receiving signals as described above to implement residual graphic effect except in the cases when a game or other triggering event initiates execution of coding by the game processor to display a player-to-game interactive feature as discussed above. In such cases, the game processor may temporarily bypass display of the residual graphic effect (such as by overriding the trailing particle effect sequence in favor of a higher priority game sequence).

Where the reels are shown on one or more display devices such as mechanical reel-mounted display devices beneath a touch-sensitive transparent panel, the residual graphic effect may be implemented on the underlying display devices. For example, where the video displays showing the various reel symbols are mounted on spinnable reels below a transparent touch-sensitive display, a player touch of the touch-sensitive display may initiate the residual graphic effect, an expanding wave or series of waves for example, actually shown on the reel-mounted display devices.

In one or more embodiments, the game processor operating the wagering game and interacting with various peripheral components in many instances is implemented as a microprocessor, such as an Intel Pentium or Core microprocessor, on a printed circuit board including one or more memory devices positioned within gaming machine 200. In alternative implementations, the game processor may be remote from gaming machine 200, such as on a server network connected to gaming machine 200, in which case the game operation as described herein may be accomplished through network communications to control the display of the game on gaming machine 200 including the lighting structure and effects as described above.

Figure 3:
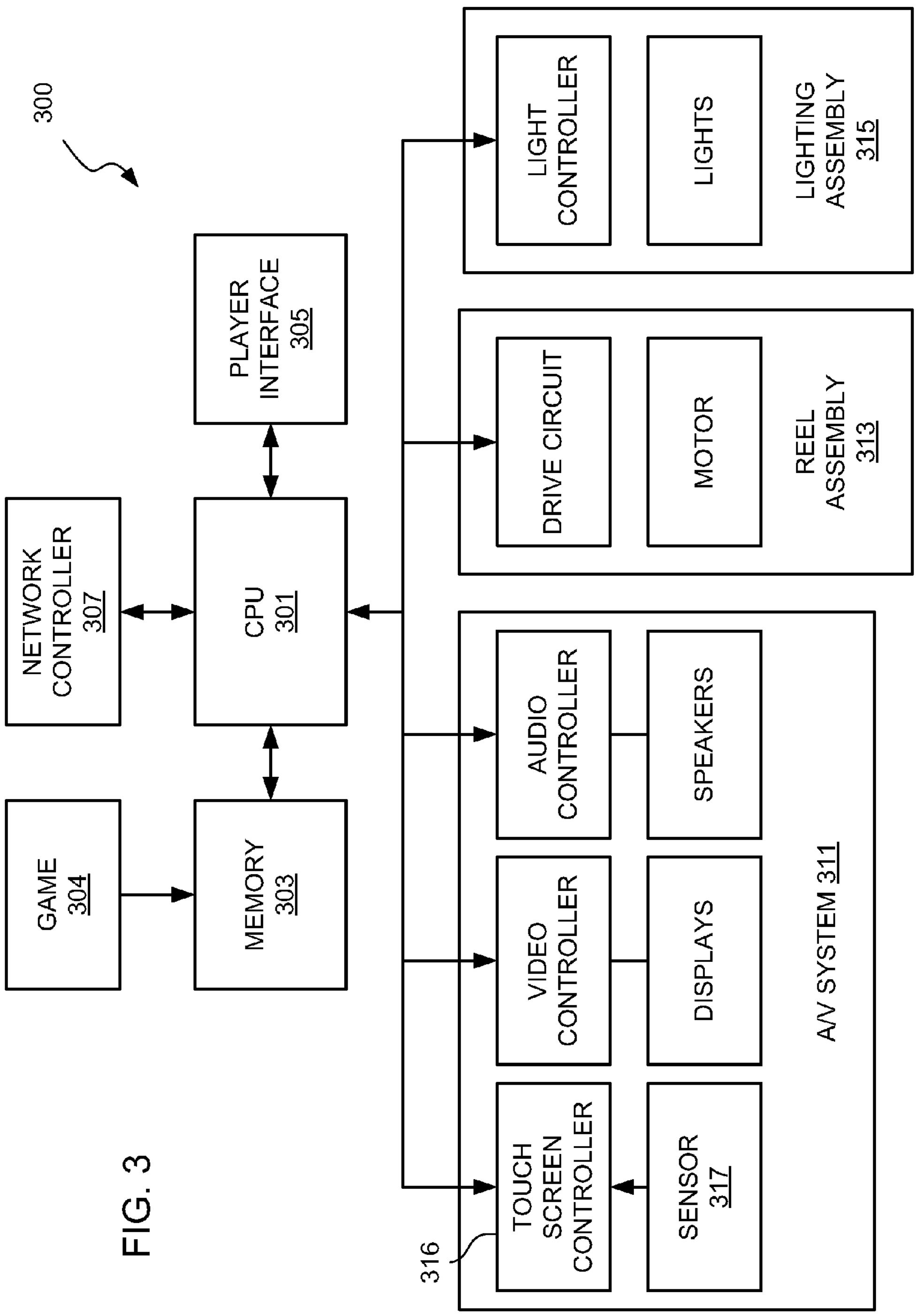
FIG. 3 is a diagrammatic representation of an example gaming machine in accordance with one or more embodiments.

FIG. 3 shows an example logical diagram 300 of gaming machine 200 including CPU 301, memory 303 with wagering game 304, player interface 305, network controller 307, audio/visual (A/V) system 311, reel assembly 313 (if mechanical reel configuration), and lighting assembly 315. The game processor, that is, CPU 301, may comprise a conventional microprocessor, such as an Intel Pentium or Core microprocessor, mounted on a printed circuit board with supporting electronics, ports, drivers, memory, and program code to communicate with and control gaming machine operations, such as through the execution of program code stored in memory 303 including one or more wagering games 304. Game processor 301 connects to player interface 305 such that a player may make inputs and game processor 301 may respond according to its programming, such as to apply a wager and initiate execution of a game.

Game processor 301 also may connect through network controller 307 to a gaming network, such as example casino server network 500 (described below in connection with FIG. 5) which may be implemented over one or more site locations and include host server 501, remote game play server 503 (which may be configured to provide game processor functionality including determining game outcomes and providing audio/visual instructions to a remote gaming device), central determination server 505 (which may be configured to determine lottery, bingo, or other centrally determined game outcomes, and provide the information to networked gaming machines 200 providing lottery and bingo-based wagering games to patrons), progressive server 507 (which may be configured to accumulate a progressive pool from a portion of wagering proceeds or operator marketing funds and to award progressive awards upon the occurrence of a progressive award winning event to one or more networked gaming machines 200), player account server 509 (which may be configured to collect and store player information and/or awards and to provide player information to gaming machines 200 after receiving player identification information such as from a player card), and accounting server 511 (which may be configured to receive and store data from networked gaming machines 200 and to use the data to provide reports and analyses to an operator). Through its network connection, gaming machine 200 may be monitored by an operator through one or more servers such as to assure proper operation, and data and information may be shared between gaming machine 200 and respective of the servers in the network such as to accumulate or provide player promotional value, to provide server-based games, or to pay server-based awards.

Game processor 301 may also connect to various devices within and about the gaming machine including A/V system 311, reel assembly 313 (for mechanical reel assemblies), and reel lighting assembly 315 through respective controllers.

Generally, activity at gaming machine 200 is initiated by a player inserting currency (which may include government-issued currency and/or privately issued vouchers) and/or a player card into a bill acceptor and card reader, respectively. Upon insertion, a signal is sent to game processor 301. In the case of the insertion of a player card, the card reader transmits card information which is directed through network controller 307 to a player tracking server connected to the network. Player data is transmitted to gaming machine 200 and, responsive to the data, game processor 301 may execute coding causing player data and a display (and possibly an audio) command to be transmitted to one of the video and/or audio controllers instructing the controllers to display player information on a respective display and possibly issue an audio greeting through one or more speakers. Concurrently, the bill acceptor sends a signal to game processor 301 which may include an identification of the currency that has been read, and game processor 301 in accordance with its coding may convert the currency amount to credits and transmit a store and display signal to a credit meter and its associated display ("Credits", e.g. FIG. 1). Once credits have been associated with the credit meter, the player may select the number of paylines and credits per line that the player wishes to wager, whereupon game processor 301, in accordance with its coding, receives the wager information from player interface 305, transmits accounting and display information to the payline ("Lines"), credits per payline ("Bet per Line"), and total bet ("Total Bet") meters and displays, transmits an update to the credit meter and display ("Credits") deducting the amount of the total bet, and initiates the wagering game.

In the case of Class III gaming devices, when a game is initiated, a random number generator (RNG) is operated by game processor 301 to determine the game outcome. Commonly, game processor 301 is positioned within gaming machine 200 and configured to manage the operation of the gaming machine components, such as shown in FIG. 3; however, the game processor may be either onboard or external to a gaming device played by a player, such as an electronic tablet (e.g. Apple iPad or gaming specific tablet), personal data assistant (PDA), cellular telephone (e.g. Blackberry or Apple iPhone), surface table (e.g. Microsoft/IGT touch-sensitive gaming surface table), etc. In such case, when the player places a wager and initiates play of the game through player interface 305 of the gaming device, the game processor may be onboard or remotely located such as within a network gaming server. In the latter case, an onboard microprocessor, controller, or digital signal processor may execute coding to transmit the wager and game request information through the network, and the remote game processor may operate an RNG to determine the game outcome.

In the case of Class II gaming devices, the overall structure of the various devices as discussed above is essentially the same with the major difference being the method of determining the game outcome. Commonly, Class II gaming devices utilize the game of bingo as the basis for determining a winning outcome where the ball draw is performed remotely by a network or central determination server (alternative games may be used for determining game outcomes, such as through a lottery drawing of a finite set of numbers, if permitted by the licensing jurisdiction). Class II gaming systems are commonly referred to as central determination systems wherein pools and sub-pools of game outcomes are determined by a central server (or gaming device) and distributed amongst a set of networked gaming devices. The distribution step may be on demand, such as when a gaming device receives a game request, or sets of game outcomes may be distributed to the various networked gaming devices in which case the game processor of the requesting gaming device may select a game outcome from the set of game outcomes, such as by using an RNG or other selection process.

Additionally, Class II gaming devices, such as a bingo-based gaming device may have multiple displays, such as are shown in FIG. 2 wherein one of the displays, such as display 223 of FIG. 2, may be used to display one or more electronic bingo cards and one or more ball drawings after a game has been initiated in accordance with the game outcome that has been provided to the gaming device by a central determination server. In the case, as in FIG. 1, where the primary display comprises a set of reels, game processor 301 converts the centrally-determined game outcome to a corresponding value outcome of the reel-based game as shown in FIG. 1, and operates the reel-based game as described above and with respect to the figures.

In one or more embodiments, coding which may be stored in memory 303 may be executable by game processor 301 to control game operation, display content, lighting, and audio through video, audio, reel drive motor controllers (for mechanical reels), and lighting controllers.

It will be noted that the illustrated A/V system 311 includes a touch screen controller 316 associated with the sensor 317. In particular, at least one of the displays associated with the gaming machine (such as a video display or a transmissive (or transparent) display over a set of mechanical reels, for example) will comprise a touch-sensitive display through which the residual graphic effect is displayed according to one or more embodiments. The touch screen controller 316 receives signals from a sensor arrangement 317 associated with a given display screen or area, and uses those signals to generate coordinate data which is then communicated to CPU 301 which is executing program code to act on the touch screen touch coordinate data. The sensor arrangement 317 may employ any touch screen sensor technology such as, for example, a resistive film, capacitive arrangement, acoustic arrangement, optical sensor arrangement, or any other touch screen sensor technology. In one example implementation, touch screen controller 316 communicates with CPU 301 through a suitable serial interface such as a USB connection. However, it will be appreciated that a touch-sensitive display used to produce the residual graphic effect described herein is not limited to any particular technology or arrangement for communication between the touch screen controller and the game processor or other processing device.

It should be noted that although gaming machine 200 is provided in this disclosure as an example gaming machine through which a residual graphic effect may be implemented, the designation "gaming machine" as used herein and the accompanying claims is not limited to that particular gaming machine or any other type or configuration of gaming machine. In particular, the designation "gaming machine" encompasses a general purpose personal computer executing gaming software either locally or through an Internet connection and web interface, or other types of personal computing devices such as smart phones, laptop PCs, tablet PCs, and any other type of computing device that includes a touch-sensitive display for producing the desired residual graphic effect.

Figure 4A:
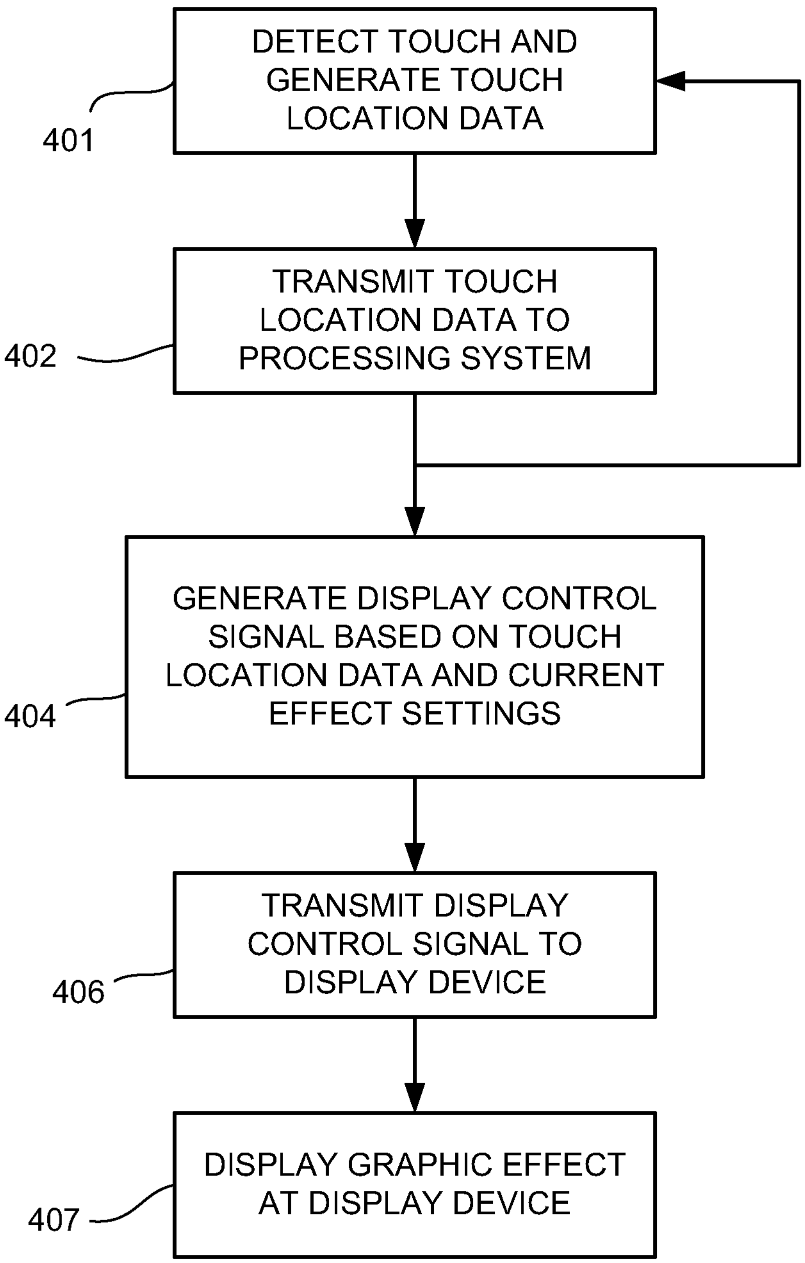
FIG. 4A is a flowchart showing a process for generating a residual graphic effect in accordance with one or more embodiments.

FIG. 4A illustrates an example flowchart describing a process for generating the residual graphic effect in accordance with one or more embodiments. The process shown in FIG. 4A may be thought of as including three different phases. A first phase comprises data collection and includes the process steps shown at process blocks 401 and 402. A second phase comprises using the data received in the first phase to generate a display control signal and includes the process steps shown at block 404 in FIG. 4A. The third phase of the process includes actually causing the touch-sensitive display device to produce the desired residual graphic effect and includes the processes indicated at process blocks 406 and 407 in FIG. 4A.

The steps of detecting a touch at the touch-sensitive display and generating touch location data as indicated at process block 401 may be performed by the combination of a sensor arrangement associated with the touch-sensitive display and touch screen controller such as the elements 317 and 316, respectively, shown in FIG. 3. In this implementation, the touch screen controller is responsible for communicating the touch location data in accordance with process block 402 to the processing device or devices which are responsible in the process for actually generating the display control signal which will be used to cause the display to produce the desired residual graphic effect. The location data may comprise generally X and Y coordinate or pixel coordinate data. Again, it should be noted that the present residual graphic effect is not limited to any particular touch screen technology or any particular way for communicating touch screen data to the processing device or devices which will act on the touch screen data.

The return arrow back to process block 401 in FIG. 4A reflects that the process steps indicated at block 401 and 402 are repeated in order to provide the desired touch location data to the processing device or devices which will generate the display control signal. This repetition of collecting touch screen data may be done on a clock cycle basis by the touch screen controller or in any other suitable fashion. The data collection repetition should be at a rate sufficient to provide the display control signal generating processing device sufficient data to produce the desired residual graphic effect.

The display control signal generating steps indicated at process block 404 may be performed in a number of different fashions depending upon the hardware included at the gaming machine. In one or more embodiments, the gaming machine hardware will include a CPU such as CPU 301 in FIG. 3 and a video controller also shown in FIG. 3 associated with the gaming machine displays. This video controller may include a graphics processing unit or GPU. The CPU in this arrangement executes the residual graphic effect program code and offloads to the GPU certain processes such as video decoding, rendering functions, and perhaps other functions which are required to ultimately produce the desired display control signal. In this arrangement, the video controller will then be responsible, under control signals provided from CPU 301, to produce the desired display control signal in the appropriate signal format for the respective touch-sensitive display device. The signal format may be for example, VGA, DVI, or HDMI. However, it should be appreciated that the present invention is not limited to any particular processing arrangement or hardware for performing the display control signal generation step indicated at process block 404. For example, it is possible for a gaming machine CPU or perhaps an additional CPU to perform all of the functions necessary to produce the desired display control signal, and thus video generation functions may not be offloaded to a GPU.

Regardless of specifically how the display control signal is generated in a given implementation using a given hardware setup, the display control signal may be thought of as having two components. A first component comprises the underlying graphic which is being produced on the display regardless of any player touch to initiate a residual graphic effect. The second component comprises a modification to that underlying graphic, and this modification represents the desired residual graphic effect. For example, for a trailing particle effect such as effect 103 in FIG. 1, the modification comprises the various emitted particles which essentially take the place of the underlying graphic on the display. In the case of a wave or ripple effect, the modification comprises the change in pixel color and intensity necessary to represent the propagating wave.

The display control signal produced by the processes shown at block 404 will be dependent upon the data received according to process block 402 and upon the current residual graphic effect settings including any personalized settings which may be then in effect through the residual graphic effect program code being executed by the processing device or devices. For example, if the current effect settings call for an effect using a discrete graphic element or icon such as a star, sparkle, or perhaps a player-selected lucky icon, the generated display control signal will cause the receiving touch-sensitive display to produce a graphic effect using that particular graphic element or icon. This graphic effect may also be dependent upon the input data provided through process block 402. For example, if the input data indicates a single tap of the touch-sensitive display, the display control signal generated at process block 404 may cause the touch-sensitive display to produce a residual graphic effect including a number of the discrete graphic elements being emitted from a location on the display at or adjacent to the player tap location. However, if the input data from the touch screen controller or other touch screen data collection arrangement indicates that the player is dragging a finger or other contactor across the touch-sensitive display, the display control signal generated at process block 404 may cause the touch-sensitive display to include an effect similar to that shown in FIG. 1 where the discrete graphic elements (sparkles or stars in that example) appear to be emitted along a path or adjacent to the path of the player touch. This produces a trailing particle graphic effect where the "particles" are the emitted discrete graphic elements. As another example, if the current residual graphic effect settings implemented by the executing program code call for a wave/ripple type residual graphic effect that does not include a discrete graphic element, and if the incoming touch screen data indicates a single player tap of the touch-sensitive display, then the display control signal produced at process block 404 may cause the touch-sensitive display to produce one or more waves or ripples which appear to propagate out across the display surface from the location of the player tap. If this wave or ripple option is in effect when the incoming touch screen data indicates that the player is dragging their finger or other contactor across the touch-sensitive display, then the display control signal generated at process block 404 may cause the touch-sensitive display to show one or more waves or ripples appearing to propagate out along the path of the player touch similar to the way in which a wake propagates along the path of the boat.

As discussed above, the graphic representing the residual graphic effect, or the individual graphic elements which may be included in the effect preferably have a limited duration on the respective touch-sensitive display. This limited duration will be reflected in the display control signal produced according to process block 404. That is, the signal will drive the touch-sensitive display to produce the graphic effect for a limited time, and then the signal will revert back to the normal display driving signal without any elements of the residual graphic effect. For example, where the effect includes discrete graphic elements such as a lucky icon, the lucky icons shown on the display to produce the residual graphic effect will eventually either disappear from the screen abruptly or gradually (such as by fading). The duration of the graphic elements included in the given residual graphic effect and the manner in which the display reverts back to the graphic without the effect is dictated by the residual graphic effect program code (perhaps including personalization settings). The duration limitation may be implemented for discrete graphic elements by associating a duration with each graphic element to be rendered in the display. The duration limitation may be implemented for non-discrete graphic element effects (such as a wave propagation effect) by associating a distance with the effect. For example, a wave effect may send a wave representation only to the edge of the display area and terminate there without any reflection.

The step performed as indicated at process block 406 in FIG. 4A may be performed in one or more embodiments by a video controller associated with the touch-sensitive display, such as the video controller shown in FIG. 3. In any event, the transmission to the display device may be in a transmission format such as VGA, DVI, or HDMI which is acceptable to the touch-sensitive display device. The touch-sensitive display device then simply displays the desired residual graphic effect as indicated at process block 407. It will be appreciated that the display also shows all of the other graphics included in the incoming video signal in addition to the graphics comprising the residual graphic effect.

Figure 4B:
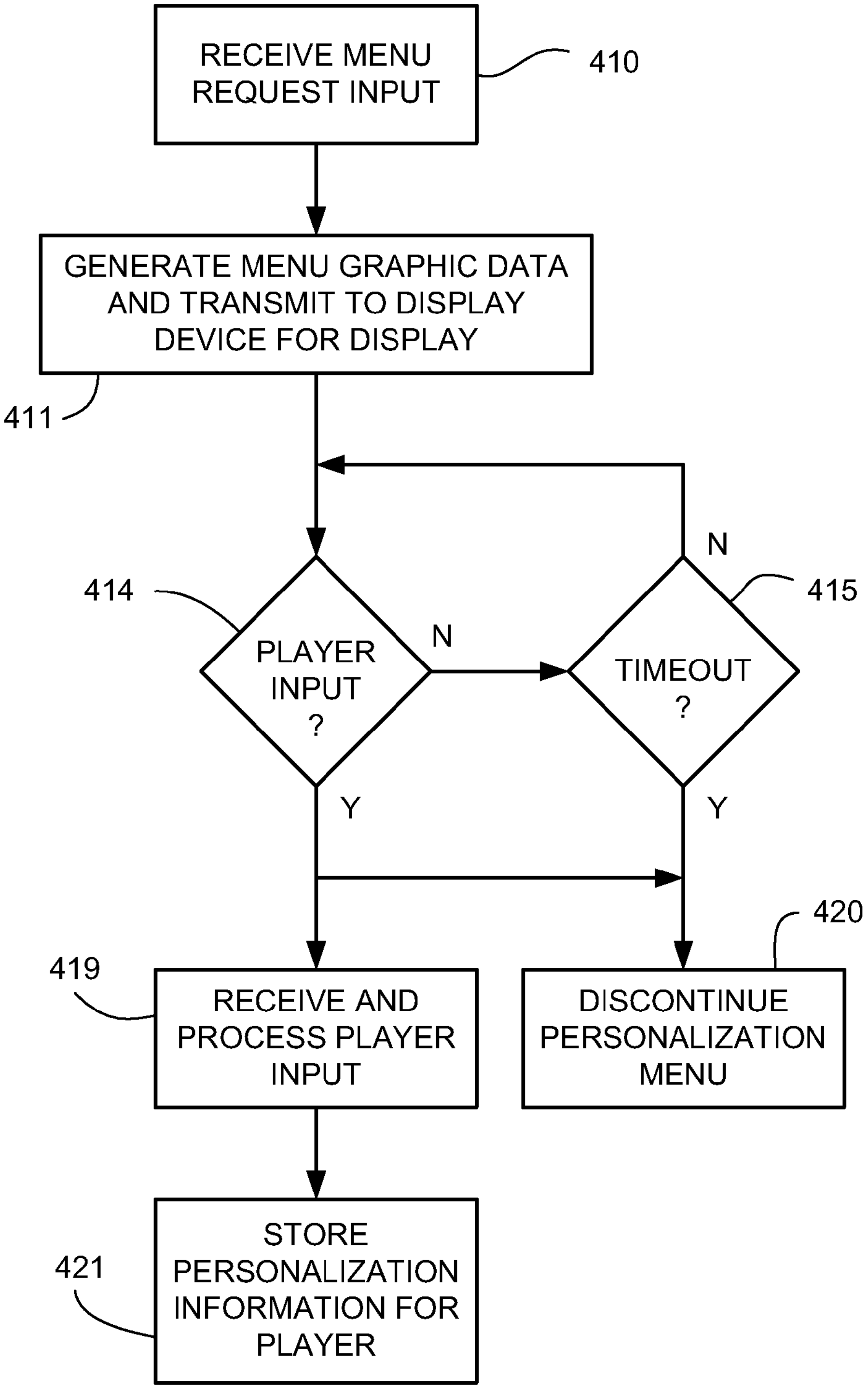
FIG. 4B is a flowchart showing a process for enabling a player to personalize a residual graphic effect in accordance with one or more embodiments.

FIG. 4B shows a process performed at a gaming machine in one or more embodiments by which a player may modify and personalize the settings used for producing the residual graphic effect. In response to the receipt of a menu request input shown at process block 410, the process includes generating menu graphic data as indicated at process block 411 and transmitting a suitable signal to the display device for displaying the desired menu. The menu request input may be any suitable input such as, for example, a tap of the touch-sensitive display or some other touch-sensitive display included at the gaming machine. Alternatively, the menu request input may be entered through some other input device included in the player interface of the gaming machine. Generating the menu graphic data and driving signal for driving the display to show the menu may be performed by a cooperating CPU and GPU as discussed above in connection with the generation of the display control signal at process block 404 in FIG. 4A, or in any other fashion suitable to the gaming machine hardware configuration.

The process shown in FIG. 4B includes waiting for a player input from the displayed menu as indicated at decision block 414. If there is no player input the process proceeds to decision block 415 to determine if the menu display has timed out. If not, the process loops back to wait for a player input. If the menu has timed out at decision block 415, the personalization menu is discontinued as indicated at process block 420.

If the player has made an input from the personalization menu as indicated at decision block 414, the process then includes receiving and processing that player input as indicated at process block 419. The manner in which the input is received will depend upon the player interface used to allow the player input. For example, if the menu is displayed on the touch-sensitive display or another touch-sensitive display, the input may comprise coordinate data from the touch screen controller associated with that particular touch-sensitive display. On the other hand, a particular gaming machine may be implemented so that a pointing device such as a trackball may be used to point a cursor to a displayed menu item, in which case the input data will be received through the pointing device controller. The invention is not limited to any particular way for receiving or inputting a request from a personalization menu for personalizing aspects of the residual graphic effect. Processing the player input at process block 419 may be performed under the control of the residual graphic effect program code or a subroutine thereof and may include simply storing the selected option in a manner suitable to the program.

In addition to storing the selected option for use by the controlling program code as it continues to execute at the gaming machine, the process may also include storing the selected options (that is, the personalization information for the player) as indicated at process block 421. This storing step may be performed using a storage device separate from the gaming machine. For example, the selected options comprising the residual graphic effect personalization information for the player may be communicated to a network device such as a player tracking controller and stored along with other player information at that device or at associated data storage. In another implementation, the selected player options comprising the personalization information may be communicated to a player card and stored in storage media associated with that card. For example, a player card may comprise a smartcard with associated memory for storing information including personalization information for personalizing the desired residual graphic effect for the given player.

It will be appreciated that once the player input is received at process block 419, it may be desirable to remove the menu graphic from the given display. Thus concurrently with a player input received as indicated at decision block 414, the process also branches to discontinue the personalization menu as indicated at process block 420.

Figure 4C:
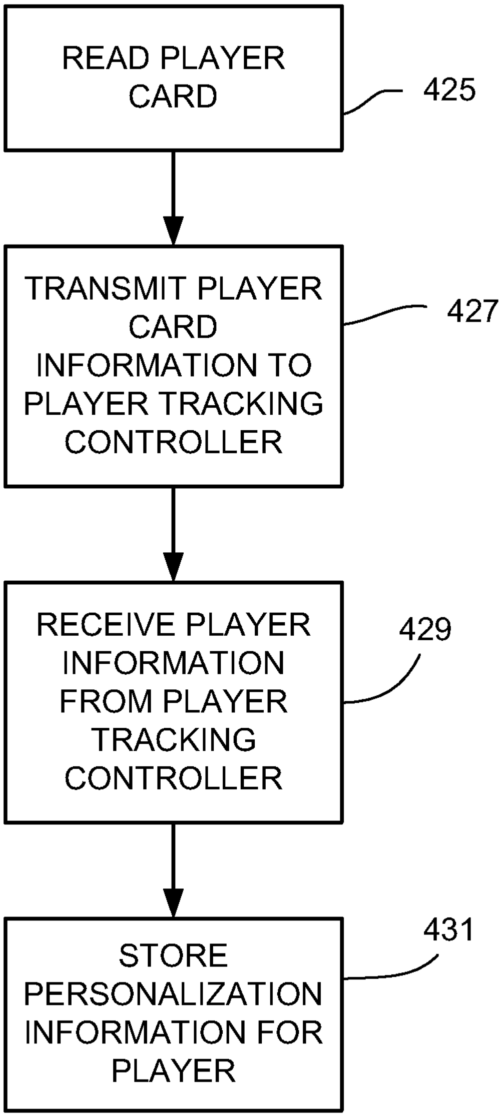
FIG. 4C is a flowchart showing another process for obtaining information to personalize a residual graphic effect in accordance with one or more embodiments.

FIG. 4C illustrates a process for obtaining personalization information for personalizing the residual graphic effect for a player. This particular process relies on a gaming system which includes a player tracking controller for tracking various information regarding the player. As indicated at block 425, this process includes reading a player card. This reading step may be performed in any number of fashions depending upon the nature of the player card. For example, the player card may include a magnetic strip which is read by a suitable magnetic strip reader associated with the gaming machine. Alternatively, the player card may include a smartcard with associated memory which is read by a smartcard reader at the gaming machine. The present invention is not limited to any particular player card technology or encoding or reading technology.

Regardless of how the player card is read at process block 425, the method also includes transmitting the player card information to the player tracking controller as indicated at process block 427. This step may be performed by the cooperation of the CPU at a gaming machine, such as CPU 301 shown in FIG. 3, and a network controller such as network controller 307 shown in that figure. For example, the CPU for the gaming machine may recognize the input from the card reader at the gaming machine as a player tracking card input and forward the information, which may include simply an identifier code for the player, to the player tracking controller through the network controller/interface device.

In response to the transmission indicated at process block 427, the player tracking controller may gather the appropriate information for the player, including residual graphic effect personalization information stored at a storage device associated with the player tracking controller, and then transmit that information to the gaming machine from which the transmission at process block 427 was initiated. The gaming machine then receives this information as indicated at process block 429 and stores the residual graphic effect personalization information in memory as indicated at process block 431. This residual graphic effect personalization information is then available for use when the residual graphic effect is invoked at the gaming machine. In particular, the personalization information may include residual graphic effect settings (such as a lucky icon selection) which are used to generate the desired display control signal in accordance with the step shown at process block 404 in FIG. 4A.

Figure 5:
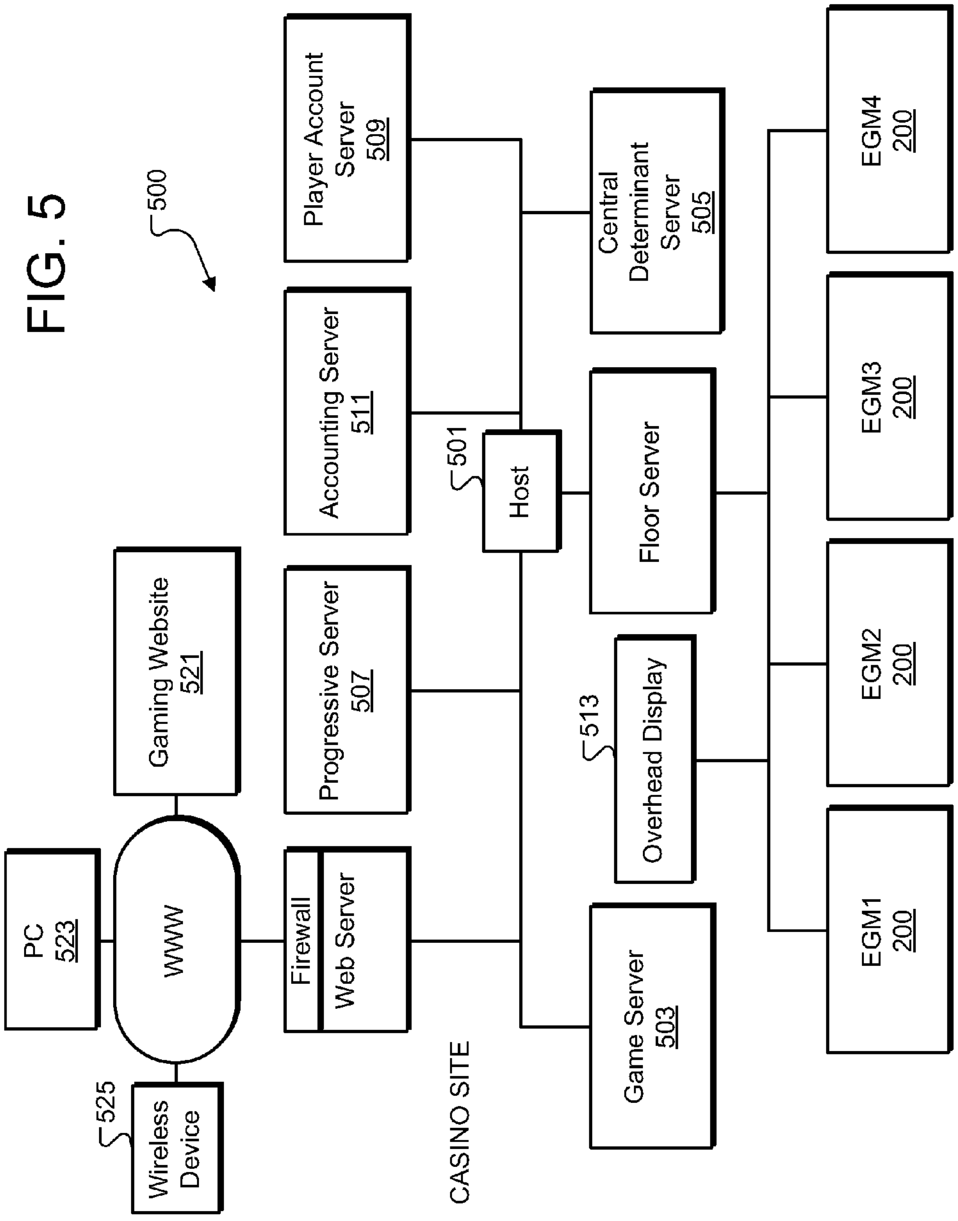
FIG. 5 is a diagrammatic representation of an example gaming network in accordance with one or more embodiments.

Referring to FIG. 5, a block diagram of example networked gaming system 500 associated with one or more gaming facilities is shown, including one or more networked gaming machines 200 incorporating a residual graphic effect (such as trailing particle effect 103 in FIG. 1) in accordance with one or more embodiments. With reference to FIG. 5, while a few servers have been shown separately, they may be combined or split into additional servers having additional capabilities.

As shown, networked gaming machines 200 (Egm 1-Egm N) and one or more overhead displays 513 may be network connected and enable the content of one or more displays 100 along with trailing particle effect 103 (FIG. 1) to be mirrored or replayed on an overhead display. For example, the primary display content may be stored by the display controller or game processor 301 and transmitted through network controller 307 to the overhead display controller either substantially simultaneously or at a subsequent time according to either periodic programming executed by game processor 301 or a triggering event, such as a jackpot or large win, at a respective gaming machine 200. In the event that gaming machines 200 have cameras installed, the respective players' video images may be displayed on overhead display 513 along with the content of the player's display 100 and any associated audio feed.

In one or more embodiments, game server 503 may provide server-based games and/or game services to network connected gaming devices, such as gaming machines 200 (which may be connected by network cable or wirelessly). Progressive server 507 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 511 may receive gaming data from each of the networked gaming devices, perform audit functions, and provide data for analysis programs, such as the IGT Mariposa program bundle.

Player account server 509 may maintain player account records, and store persistent player data such as accumulated player points and/or player preferences (e.g. a personalized trailing particle effect, such as shamrocks, gold coins, sparklers, etc.). For example, player interface display 211 may be programmed to display a player menu that may include a choice of trailing particle effect icons or elements that may be selected to personalize the trailing particle effect generated on the display, such as on displays 207 and 221 shown in FIG. 2.

In one or more embodiments, the player menu may be programmed to display after a player inserts a player card into the card reader. When the card reader is inserted, an identification code may be read from the card and transmitted to player account server 509. Player account server 509 transmits player information through network controller 307 to player interface 210 for display on player interface display 211. Player interface display 211 may provide a personalized welcome to the player, the player's current player points, and any additional personalized data, such as the player's current choice of residual graphic effect lucky icon or other graphic element as discussed above in connection with FIG. 4C. If the player has not previously made a selection, then this information may or may not be displayed. An icon may be provided on the display to open a residual graphic effect personalization menu or the menu may be displayed automatically. Once the player makes a selection, the information may be transmitted to game processor 301 for use with the residual graphic effect program code to generate the residual graphic effect with the player's selected icon or element. Also, the player's selection may be transmitted to player account server 509 where it may be stored in association with the player's account for transmission to the player in future gaming sessions. The player may change the residual graphic effect icon or element at any time using player interface display 211 (which may be touch-sensitive or have player-selectable buttons associated with the various display selections). Gaming machine 200 may be operated together with the personalized residual graphic effect as described above with respect to the various figures.

The selection of a player personalized lucky icon has thus far been described as occurring at a gaming apparatus. However, if a gaming operator has established a website accessible by players, e.g. gaming website 521, gaming website 521 may include a selectable menu including a player-selectable lucky icon or residual graphic effect personalization menu. In this case, the player may use personal computer 523 or handheld wireless device 525 (e.g. Blackberry cell phone, Apple iPhone, personal data assistant (PDA), iPad, etc.) to enter the website, log in with a user name (that may be associated with the player's account information stored on player account server 509), make a selection and save it, so that on the next gaming session, the player's personalized lucky icon may be associated with the residual graphic effect programming at the player's selected gaming machine 200. Then, when the player touches or slides a finger along the touch-sensitive display, the residual graphic effect may include the player's personalized lucky icon as selected from gaming website 521. In a further embodiment, gaming website 521 may provide an option for a player to download a lucky icon or element which may be rendered by the website programming to be used to generate a residual graphic effect. Once downloaded, the website may provide the option for the player to drag a mouse across or around an area wherein the website programming may generate a corresponding residual graphic effect which may dissipate as described above within a few seconds, thereby allowing a player to view the residual graphic effect with the personalized icon or element and decide whether to save the selection or to make a different selection of icon.

In one or more embodiments, wagering games may be played through PCs 523 and/or wireless devices 525 connected to a server, such as gaming website 521, or by connecting to game server 503 through a casino firewall (e.g. server-based gaming). In such instances, PCs 523 and/or wireless devices 525 may include touch screen displays and be operable substantially in the same manner as described above, such that residual graphic effect (such as effect 103 in FIG. 1) may be initiated by a player's touch and reflect the player's interaction with the display before, during, and/or after play of the wagering game. In variations of these embodiments, one or more networked PCs 523 and/or wireless devices 525 may not have a touch screen display and may have alternative player interfaces, such as a mouse or joystick, which may be operable to be used by a player in place of touching the display to generate residual graphic effect 103. For example, a mouse may be configured to enable a player to select a wager and click or press enter to enter the wager, then the player may select 'Play' and click to initiate the game; beforehand or thereafter, the mouse may be configured to enable a player to depress a 'left' click and slide the mouse in a player selected pattern which may initiate the signals as described above resulting in the generating of a residual graphic effect such as trailing particle effect 103. In one or more embodiments, the player may access a menu on PC 523 or wireless device 525 to select a personalized icon or element to be used in generating a residual graphic effect. In one or more embodiments, the wagering game may be a simulated wagering game playable with 'play' money, wherein the accumulated credits may be used to rank a player on a leader board and/or be used to exchange for promotional credits or value useable at a sponsor's facility (e.g. casino facility).

Although the residual graphic effect has been described above generally in terms of a graphic effect which does not interact with the play of a game, it is possible that a residual graphic effect may provide some game interaction. For example, a game such as the reel-type game portrayed in FIG. 1 may call for one or more symbols within the reel matrix to become wild for a given play or otherwise change character for the purpose of the game or bonus round. In this example, rather than simply changing the character of the symbol, the player may be prompted to "disclose" the changed symbols via a residual graphic effect. In response to the prompt, the player may tap the screen to produce a wave-type residual graphic effect, with the wave functioning to change the character of the symbols which have been designated for the change. Continuing with this example, the wave may be depicted as causing a given symbol to catch fire or change color as the wave passes. As an example using a discrete graphic element-type residual graphic effect, the player may run a finger over the touch-sensitive display to leave a trail of sparkles which eventually settle on one or more symbols which are designated as having a character change. The settled sparkles may indicate that the symbol has changed or a further graphic change may occur for the symbol(s) after the sparkles settle.

Referring generally to the forgoing description, as used herein the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described example embodiments are intended to illustrate the principles of the invention, but not to limit the scope of the invention. Various other embodiments and modifications to these preferred embodiments may be made by those skilled in the art without departing from the scope of the present invention. For example, while the selection of a player personalized lucky icon has been described as occurring at a gaming apparatus, if a gaming operator has established a website accessible by players, the website may include a selectable menu including a player-selectable lucky icon menu. In which case, the player may make a selection and save it, so that on the next gaming session, the player's personalized lucky icon may be associated with the trailing particle effect programming; then, when the player touches or slides a finger along the touch-sensitive display, the trailing particle effect may include the player's personalized lucky icon.

The invention claimed is:

1. A method of operating a wagering game including:

displaying a matrix of symbol locations on a game display of a gaming machine, the matrix of symbol locations being displayed at least partially in a touch-sensitive portion of the game display;

receiving a set of one or more first player inputs through a player interface of the gaming machine to initiate a play in the wagering game, the set of one or more first player inputs defining a wager for the play in the wagering game and defining one or more active paylines for the play in the wagering game;

responsive to the set of one or more first player inputs, displaying the play in the wagering game, the play in the wagering game including an animation which updates symbols shown in the matrix of symbol locations to reflect a game result for the play in the wagering game;

providing an award if the game result is a winning result;

receiving a touch input in an area of the matrix of symbol locations being displayed in the touch-sensitive portion of the game display, the touch input being separate from the set of one or more first player inputs to initiate the play in the wagering game and being received at a point in time before or during the animation which updates the symbols shown in the matrix of symbol locations; and responsive to the touch input, displaying a temporary residual graphic effect on the touch-sensitive portion of the game display at or adjacent to one or more locations included in the touch input, the temporary residual graphic effect persisting on the touch-sensitive portion of the game display for a period of time following the touch input, and the game result being identified independently of the temporary residual graphic effect.

2. The method of claim 1 wherein displaying the temporary residual graphic effect includes displaying a trail of discrete graphic elements along the locations included in, or adjacent to, the touch input.

3. The method of claim 2 wherein the discrete graphic elements move across the touch-sensitive display according to one or more discrete element movement parameters.

4. The method of claim 2 wherein displaying the discrete graphic elements includes causing one or more of the discrete graphic elements to change visual characteristics over time.

5. The method of claim 4 wherein the visual characteristic change includes causing the discrete graphic elements to fade away gradually on the touch-sensitive display.

6. The method of claim 5 wherein the visual characteristic change includes changing the size, color, or shape of one or more of the discrete graphic elements.

7. The method of claim 1 wherein displaying the temporary residual graphic effect includes displaying a graphic effect without a discrete graphic element along the locations included in or adjacent to the touch input.

8. The method of claim 7 wherein the graphic effect expands across the display from the locations included in the touch input to other locations not at or adjacent to the touch input.

9. The method of claim 8 wherein the temporary residual graphic effect interacts with one or more symbols displayed on the touch-sensitive display prior to the touch input to change a visual characteristic of the one or more symbols.

10. The method of claim 1 further including:

receiving a second player input at the gaming machine;

responsive to the second player input, displaying a player personalization menu at the gaming machine, the player personalization menu including a number of temporary residual graphic effect options including one or more of (i) a number of discrete graphic elements to be included in the temporary residual graphic effect, and (ii) one or more non-discrete graphic effects to be included in the temporary residual graphic effect;

responsive to a third player input, selecting one or more of the temporary residual graphic effect options; and responsive to an additional touch input, displaying a modified temporary residual graphic effect on the touch-sensitive display at or adjacent to one or more locations included in the additional touch input, the modified temporary residual graphic effect persisting on the touch-sensitive display for a period of time following the touch input, and being displayed according to the selected one or more temporary residual graphic effect options.

11. The method of claim 10 further including:

storing the selected one or more temporary residual graphic effect options at a storage device separate from the gaming machine;

communicating the selected one or more temporary residual graphic effect options from the storage device to an additional gaming machine responsive to a player login or other activation of the additional gaming machine; and responsive to a touch input at a touch-sensitive display of the additional gaming machine, displaying a temporary residual graphic effect on the touch-sensitive display of the additional gaming machine at or adjacent to one or more locations included in the touch input, the temporary residual graphic effect persisting on the touch-sensitive display for a period of time following the touch input.

12. A gaming machine for a wagering game, the gaming machine including:

(a) a display device having a touch-sensitive portion;

(b) a player input system;

(c) at least one processor; and (d) at least one memory device storing instructions executable by the at least one processor to:

(i) cause the display device to display a matrix of symbol locations, the matrix of symbol locations being displayed at least partially in the touch-sensitive portion of the display device;

(ii) receive a set of one or more first player inputs through a player input system to initiate a play in the wagering game, the set of one or more first player inputs defining a wager for the play in the wagering game and defining one or more active paylines for the play in the wagering game;

(iii) responsive to the set of one or more first player inputs, cause the display device to display the play in the wagering game, the play in the wagering game including an animation which updates symbols shown in the matrix of symbol locations to reflect a game result for the play in the wagering game;

(iv) provide an award for the play in the wagering game if the game result is a winning result;

(v) through the touch-sensitive portion of the display device, receive a touch input in an area of the matrix of symbol locations being displayed in the touch-sensitive portion of the display device, the touch input being separate from the set of one or more first player inputs to initiate the play in the wagering game and being received at a point in time before or during the animation which updates the symbols shown in the matrix of symbol locations; and (vi) responsive to the touch input, cause the display device to display a temporary residual graphic effect at or adjacent to one or more locations included in the touch input, the temporary residual graphic effect persisting on the display device for a period of time following the touch input, and the game result being identified independently of the temporary residual graphic effect.

13. The gaming machine of claim 12 wherein the temporary residual graphic effect includes displaying a trail of discrete graphic elements along locations included in or adjacent to the player touch input.

14. The gaming machine of claim 12 wherein the temporary residual graphic effect includes a graphic effect without a discrete graphic element along the locations included in or adjacent to the player touch input.

15. The gaming machine of claim 12 wherein the temporary residual graphic effect interacts with one or more symbols on the display or additional display which are displayed prior to the player touch input, the interaction changing a visual characteristic of the one or more symbols.

16. The gaming machine of claim 12 wherein:

the display or additional display is responsive to a second player input to display a player personalization menu, the player personalization menu including a number of temporary residual graphic effect options including one or more of (i) a number of discrete graphic elements to be included in the temporary residual graphic effect, and (ii) one or more non-discrete graphic effects to be included in the temporary residual graphic effect;

the gaming machine is responsive to a third player input to select one or more of the temporary residual graphic effect options; and the display or additional display is responsive to an additional player touch input to display a modified temporary residual graphic effect at or adjacent to one or more locations included in the additional player touch input, the modified temporary residual graphic effect persisting on the respective display for a period of time following the touch input, and being displayed according to the selected one or more temporary residual graphic effect options.

17. The gaming machine of claim 12 further including a receiving device for receiving one or more temporary residual graphic effect options from a device separate from the gaming machine, and wherein the display or additional display is responsive to an additional player touch input to display a modified temporary residual graphic effect at or adjacent to one or more locations included in the additional player touch input, the modified temporary residual graphic effect persisting on the respective display for a period of time following the touch input, and being displayed according to the received one or more temporary residual graphic effect options.

18. A gaming system including:

two or more gaming machines, each gaming machine including:

a player interface operative to receive a set of one or more first player inputs to initiate a play in a wagering game, the set of one or more first player inputs defining wager for the play in the wagering game and defining one or more active paylines for the play in the wagering game;

a display operative to display the play in the wagering game at the gaming machine responsive to the set of one or more first player inputs, the play in the wagering game including an animation which updates symbols shown in a matrix of symbol locations in a touch-sensitive area of the display to reflect a game result for the play in the wagering game;

the display of the gaming machine being responsive to a player touch in the touch-sensitive area of the display to display a temporary residual graphic effect at or adjacent to one or more locations included in the player touch input, the temporary residual graphic effect persisting on the display for a period of time following the player touch input, and the game result being identified independently of the temporary residual graphic effect;

the display or an additional display being responsive to a second player input to select one or more temporary residual graphic effect options from a player personalization menu displayed on the respective display, the player personalization menu including a number of temporary residual graphic effect options including one or more of (i) a number of discrete graphic elements to be included in the temporary residual graphic effect, and (ii) one or more non-discrete graphic effects to be included in the temporary residual graphic effect; and a storage device located remotely from each gaming machine, the storage device storing a respective selected one or more temporary residual graphic effect options selected at one of the gaming machines, the storage device being operable to communicate the respective selected one or more temporary residual graphic effect options to any one of the gaming machines.

19. A program product stored on one or more tangible, non-transitory computer readable media, the program product including:

wagering game program code executable by one or more gaming machine processors to (i) cause a gaming machine display device to display a game play responsive to a set of one or more first player inputs received through a player interface of the gaming machine, the set of one or more first player inputs defining a wager for the play in the wagering game and defining one or more active paylines for the play in the wagering game, and the displayed game play including an animation which updates symbols shown in a matrix of symbol locations in a touch-sensitive area of the display device to reflect a game result for the play in the wagering game, and to (ii) provide an award if the game result is a winning result; and temporary residual graphic effect program code executable by the one or more gaming machine processors to cause the touch-sensitive area of the display device to display a temporary residual graphic effect in response to a player touch input in the touch-sensitive area of the display device at a point in time before or during the animation which updates the symbols shown in the matrix of symbol locations, the temporary residual graphic effect being displayed at or adjacent to one or more locations included in the player touch input and persisting on the touch-sensitive area of the display device for a period of time following the touch input, and the game result being identified independently of the temporary residual graphic effect.

* * * * *